(12) United States Patent
Lee et al.

(10) Patent No.: US 11,260,792 B1
(45) Date of Patent: Mar. 1, 2022

(54) METHOD OF CONTROLLING TONE OF ELECTRIC VEHICLE BASED ON MOTOR VIBRATION IN DECELERATION OR REGENERATIVE BRAKING CONDITIONS

(71) Applicants: Hyundai Motor Company, Seoul (KR); Kia Corporation, Seoul (KR)

(72) Inventors: Dong-Chul Lee, Anyang-si (KR); In-Soo Jung, Goyang-si (KR); Bo-Yong Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/319,273

(22) Filed: May 13, 2021

(30) Foreign Application Priority Data

Sep. 28, 2020 (KR) .......................... 10-2020-0126099

(51) Int. Cl.
*B60Q 1/50* (2006.01)
*B60Q 5/00* (2006.01)
*G10K 15/02* (2006.01)
*B60W 50/14* (2020.01)

(52) U.S. Cl.
CPC .............. *B60Q 5/008* (2013.01); *B60W 50/14* (2013.01); *G10K 15/02* (2013.01); *G10K 2210/1282* (2013.01)

(58) Field of Classification Search
CPC ....... B60Q 5/008; B60W 50/14; G10K 15/02; G10K 2210/1282
See application file for complete search history.

(56) References Cited

U.S. PATENT DOCUMENTS

| 8,200,406 B2 * | 6/2012 | Stephenson | B60T 7/042 |
| | | | 701/70 |
| 8,930,085 B2 * | 1/2015 | Takeuchi | B60W 50/085 |
| | | | 701/48 |
| 9,911,405 B2 | 3/2018 | Lee et al. | |
| 10,195,902 B1 * | 2/2019 | Lee | B60Q 9/00 |
| 2017/0229053 A1 * | 8/2017 | Ishizuka | B60Q 1/2607 |
| 2017/0330550 A1 | 11/2017 | Lee et al. | |
| 2017/0334455 A1 * | 11/2017 | Asakura | B60J 3/04 |

(Continued)

FOREIGN PATENT DOCUMENTS

KR  20170128938 A  11/2017

*Primary Examiner* — Munear T Akki
(74) *Attorney, Agent, or Firm* — Slater Matsil, LLP (57) ABSTRACT

A method of controlling a tone of an electric vehicle (EV) includes calculating order components from vibration signals of a rotating motor of the EV, extracting an $N^{th}$ order component having a determination coefficient $R^2$ which represents linearity with respect to an output torque of the motor and is greater than or equal to a predetermined value, converting an RPM of the motor into a frequency and calculating an order frequency, arranging the order components by applying a vibration level of the $N^{th}$ order component to a level of the order frequency to be output and setting an EV mode tone, and in a deceleration of the EV, determining a deceleration condition and applying the vibration level of the $N^{th}$ order component to level control of the order frequency.

19 Claims, 8 Drawing Sheets

(56) References Cited

U.S. PATENT DOCUMENTS

2018/0304804 A1* 10/2018 Tatara ..................... B60Q 1/50
2018/0330710 A1* 11/2018 Badino ................ G10K 11/178
2021/0201885 A1*  7/2021 Bastyr .............. G10K 11/17873

* cited by examiner

METHOD OF CONTROLLING TONE OF ELECTRIC VEHICLE BASED ON MOTOR VIBRATION IN DECELERATION OR REGENERATIVE BRAKING CONDITIONS

CROSS-REFERENCE TO RELATED APPLICATIONS

This application claims the benefit of Korean Patent Application No. 10-2020-0126099, filed on Sep. 28, 2020, which application is hereby incorporated herein by reference.

TECHNICAL FIELD

Exemplary embodiments of the present disclosure relate to a method of controlling a tone of an electric vehicle (EV) based on a motor vibration in deceleration or regenerative braking conditions.

BACKGROUND

Recently, owing to the emergence of vehicles which do not make engine noise, such as electric vehicles (EVs) capable of traveling using all motors, there is a trend in which it is mandatory to install noise generators in eco-friendly vehicles. Generally, noise generated from a vehicle causes discomfort to a certain extent to a driver as well as nearby pedestrians and increases vehicle recognition abilities of the pedestrians recognizing surrounding vehicles through a sense of sight and a sense of hearing, thereby serving to prevent traffic accidents in advance.

Accordingly, tone control for the EVs has been mainly developed to store and play back virtual sounds. The reason is that, unlike an internal combustion engine vehicle, the EV is very quiet during acceleration and deceleration, and only high-frequency electromagnetic noise is generated from the EV.

A recent tone control technology increases a driving pleasure of a driver through a sense of sight and a sense of hearing to be recognized as vehicle marketability. Therefore, it is required to store and generate music or sound which is suitable for an EV, and in particular, it is necessary to control even a tone during deceleration or regenerative braking.

SUMMARY

Exemplary embodiments of the present disclosure relate to a method of controlling a tone of an electric vehicle (EV) based on a motor vibration in deceleration or regenerative braking conditions, which performs tone control on the EV based on a motor vibration of the EV using the motor as a power source.

An embodiment of the present disclosure provides, as a proposal for a technology for controlling a tone, which corresponds to performance of an electric vehicle (EV) and is desired by a customer, based on a characteristic of an EV motor which replaces power of a general internal combustion engine, a technology for controlling an EV tone, which is capable of extracting order components of a motor vibration in real time, which is highly correlated with a motor output characteristic of the EV, the motor output characteristic corresponding to power performance of an internal combustion engine, implementing desired sound of the internal combustion engine, the desired sound coinciding with a power performance characteristic of the EV, and controlling ultra-modern sound using a high frequency characteristic and is directed to the technology for controlling an EV tone even in deceleration or regenerative braking of the EV.

Other advantages of the present disclosure can be understood by the following description and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, a method of controlling a tone of an EV based on a motor vibration in deceleration or regenerative braking conditions includes calculating, by a vibration sensor signal processing controller, order components from vibration signals of a rotating motor of the EV, extracting, by the vibration sensor signal processing controller, an $N^{th}$ order component having a determination coefficient $R^2$ which represents linearity with respect to an output torque of the motor among the calculated order components and is greater than or equal to a predetermined value, converting, by the vibration sensor signal processing controller, a revolutions per minute (RPM) of the motor of the EV into a frequency and calculating an order frequency, arranging, by the vibration sensor signal processing controller, the order components by applying a vibration level of the $N^{th}$ order component to a level of the order frequency to be output and setting an EV mode tone, in a deceleration condition of the EV, determining and applying a deceleration condition to level control of the order frequency for setting the EV mode tone, and outputting the EV mode tone to which a deceleration intent is applied, wherein the deceleration condition is determined by driver braking or/and regenerative braking.

When it is determined as the deceleration condition, a fade-out algorithm may be used in the level control of the order frequency, and the fade-out algorithm may use a multiplied result of deceleration weight values using one or more among a decrement in RPM of the motor of the EV, a decrement in accelerator pedal position, a decrement in vehicle speed, and an increment in pedal effort of a brake.

The rearrangement of the order components may use an indoor audio or speaker so as to provide deceleration notification sound to the driver, and the rearrangement of the order components may use an outdoor speaker so as to provide deceleration sound for protection of external pedestrians.

Meanwhile, apart from the vibration sensor signal processing controller, a signal processing controller of an amplifier may be applied to acquire and calculate the deceleration condition of the EV from vehicle controller area network (CAN) data.

DETAILED DESCRIPTION OF ILLUSTRATIVE EMBODIMENTS

Exemplary embodiments of the present disclosure will be described below in more detail with reference to the accompanying drawings, and these embodiments are examples of the present disclosure and may be embodied in various different forms by those skilled in the art to which the present disclosure pertains so that the present disclosure is not limited to these embodiments.

Figure 1:
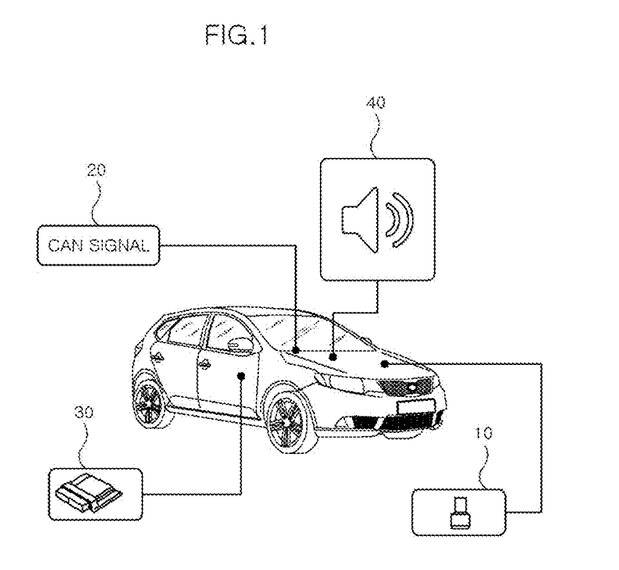
FIG. 1 is a diagram illustrating an electric vehicle (EV) to which embodiments of the present disclosure are applied.
Figure 2:
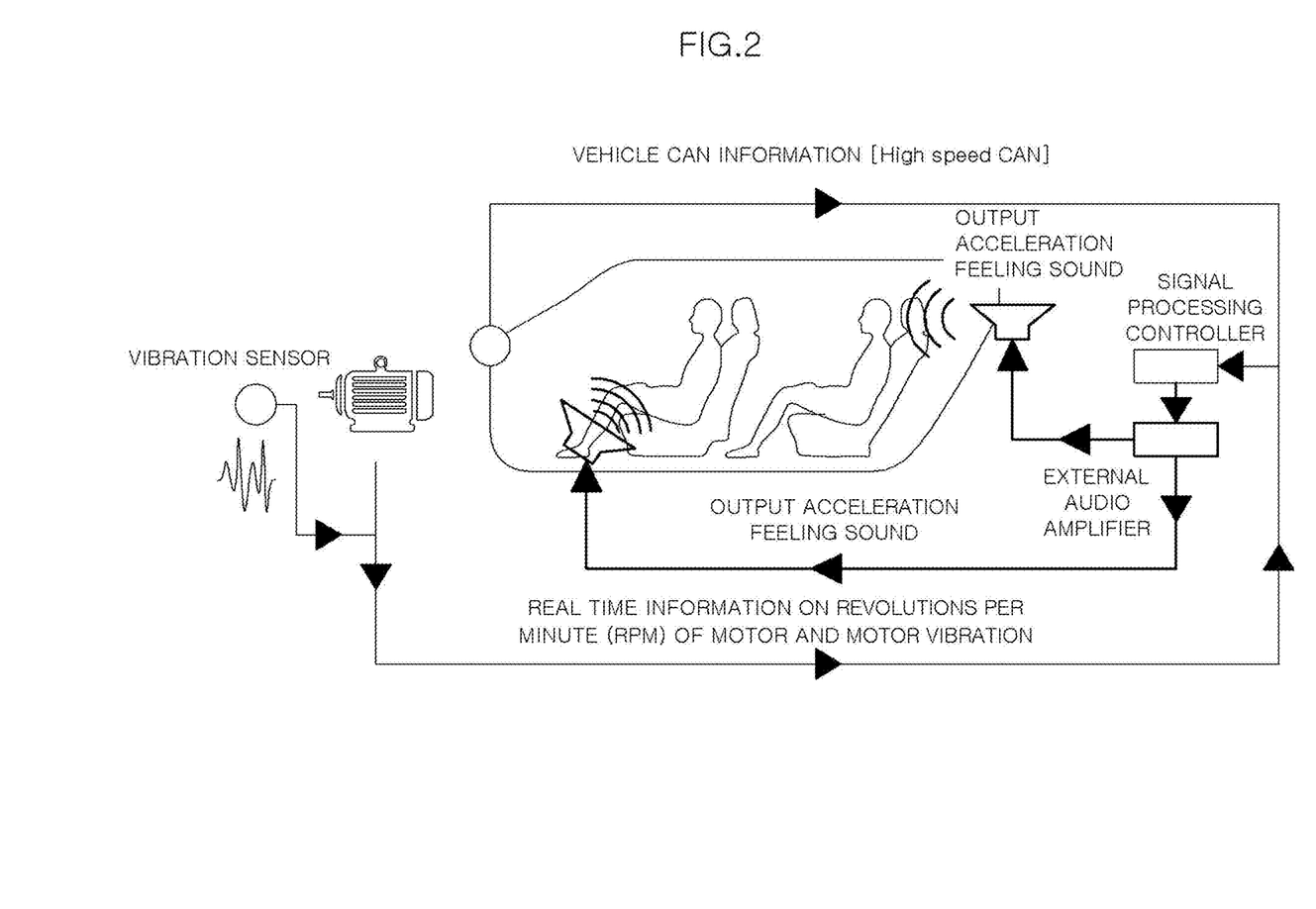
FIG. 2 is a diagram illustrating an example of flows of an input value and an output value in embodiments of the present disclosure.

FIG. 1 is a diagram illustrating an electric vehicle (EV) to which embodiments of the present disclosure are applied, and FIG. 2 is a diagram illustrating an example of flows of an input value and an output value in embodiments of the present disclosure.

Referring to FIG. 1, a vibration sensor 10 for measuring a vibration signal generated when a motor rotates, a controller area network (CAN) signal 20 connected through a CAN communication in a vehicle, a signal processing controller 30 for processing the vibration signal and the CAN signal 20, and a sound output device 40 are mounted in the EV to implement embodiments of the present disclosure.

A vibration signal of a motor, which is measured by the vibration sensor 10, is input to the signal processing controller 30 so that it is possible to measure a vibration characteristic according to a rotation of the motor in real time. The vibration sensor 10 may employ a micro electromechanical systems (MEMS) sensor which includes a knocking sensor method capable of converting an analog signal into a digital signal through a digital signal conversion module and in which the digital signal is processed itself.

A revolutions per minute (RPM) of the motor, an opening degree amount of an acceleration pedal, and a vehicle speed may be acquired from the CAN signal 20, and information on a drive mode change, motor power, and a vehicle traveling characteristic may also be acquired.

The signal processing controller 30 may determine a traveling condition with respect to whether a vehicle is traveling at an acceleration speed, a deceleration speed, or a constant speed or determine an intent of a driver from the vibration signal and the CAN signal 20 which are input signals and may generate a target tone signal using the RPM and the vibration signal of the motor to transmit the target tone signal to the sound output device 40 as output data. A digital signal processor (DSP) may be applied to an audio layer of the vehicle. The DSP may also be used for voice coding which digitizes voice which is an analog signal and refers to an integrated circuit which allows a mechanical device to rapidly process a digital signal.

The sound output device 40 outputs output data received from the signal processing controller 30 through a speaker installed to output a specific frequency band in an engine room in which the motor is built. The sound output device 40 may be installed in an outer side of the engine room instead of an inner side thereof for the purpose of protecting pedestrians, and sound may be output through an audio speaker installed in a vehicle interior for the driver or a passenger.

FIG. 2 is a diagram illustrating that the signal processing controller 30 acquires and calculates real-time information on the RPM and a vibration of the motor and vehicle CAN information from the vibration sensor 10 and then outputs acceleration or deceleration sound to an interior of the vehicle through an external audio amplifier. As described above, a position of the sound output device 40 may be the outside of the vehicle or an interior of the engine room.

A vibration level due to a rotation of the motor of the EV exhibits a very low value when compared with a vibration level due to combustion of an internal combustion engine. Thus, it is important to select a position of a sensor, at which the sensor is capable of accurately extracting a small variation in vibration level. A method of selecting a position of a sensor is as follows.

(1) First, selecting a position with a high amplitude while sweeping a frequency through analysis of a structural analysis model of the motor of the EV. Since a vibration sensor should be installed on a flat surface, a position with high amplitude sensitivity should be selected based on the flat surface. In addition, the vibration sensor measures a vibration in a direction perpendicular to a seating surface. That is, an amplitude variation in a vertical direction with respect to the seating surface may be predicted through the structural analysis.

(2) After the structural analysis, actually measuring an output torque for each load of the motor and, simultaneously, a level variation for each vibration order of the motor and performing regression analysis with respect to a variation in output torque of the motor and a variation in order level according to the load of the motor. Thus, it is possible to extract a position with high sensitivity at which a maximum amplitude is formed using an output characteristic of the motor and an $N^{th}$ order component having a determination coefficient $R^2$ of 0.9 or more. That is, a position which best represents an amplitude characteristic due to a vibration of the motor may be selected as a final position.

In the EV, power performance of the motor is expressed as an output torque of the motor. In embodiments of the present disclosure, in order to perform tone control based on the vibration of the motor, a component having a high correlation with the tendency of the output torque of the motor of an order characteristic and an order level characteristic of the motor should be extracted and selected as an $N^{th}$ order component on the basis of the RPM of the motor among a lot of pieces of information with respect to the vibration signal of the motor. The order component is differently exhibited according to an internal structure of the motor including the number of magnetic cores.

Figure 3:
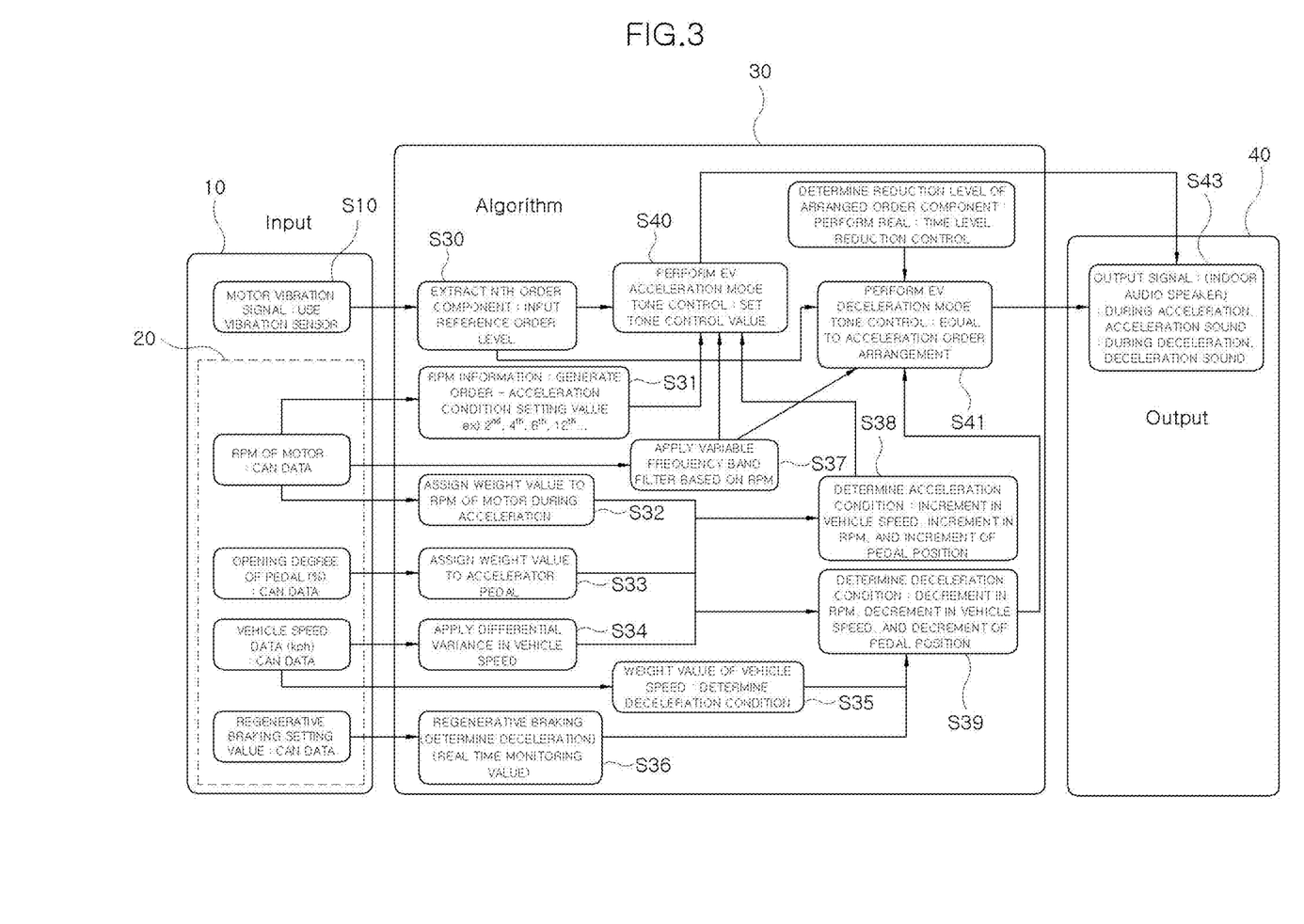
FIG. 3 is a flowchart for describing an algorithm from an input of various signals to an output of a sound output device.

FIG. 3 is a diagram for describing an algorithm showing a calculation process from inputting of various signals (S10) to outputting of the sound output device 40 (S43).

A signal being input may be measured such that the vibration signal of the motor of the EV is measured using the vibration sensor 10, and the RPM of the motor of the EV, an opening degree amount of a pedal, data of a vehicle speed, and a regenerative braking setting value may be input from the CAN signal 20. Calculation of the algorithm, which will be described below, is performed in the signal processing controller 30, and a final output is calculated in the sound output device 40 including indoor and outdoor audio speakers.

An $N^{th}$ order component is extracted from the input vibration signal of the motor, the $N^{th}$ order component is set as a reference order component, and a level with respect to the $N^{th}$ order component, that is, a level with respect to the reference order component, is determined (S30).

The reference order component is initially calculated once from the $N^{th}$ order component and then is input to the signal processing controller 30 so that the reference order component may always be used as a reference order component. Alternatively, it is also possible to set such that the $N^{th}$ order component is newly extracted from the vibration signal of the motor every specific time and is automatically determined by the signal processing controller 30.

Meanwhile, an order component (e.g., second, fourth, sixth, or twelfth order) generated with respect to the RPM of the motor, which is acquired in real time, may be generated (S31).

When the $N^{th}$ order component, which becomes a reference for an input of the order level, is determined in S30, an order may be arranged by matching the $N^{th}$ order component to the order component generated in S31, and an amplification level of the arranged order component may be determined to perform real-time amplification control (S40).

First, a variable frequency band filter is applied to the RPM of the motor of the EV from the CAN signal 20 (S37). The variable frequency band filter means a band-pass filter and is a filter which removes a component having a frequency that is less than or equal to a predetermined frequency and a component having a frequency that is greater than or equal to a predetermined frequency from an input signal to output components within only a predetermined band. The variable frequency band filter may be formed of a combination of a low-pass filter and a high-pass filter. Thus, in S40 or S41 subsequent to S37, an EV mode tone may be implemented for only a predetermined band region.

Meanwhile, in order to reflect a variation in vehicle power performance in the tone control of the EV and realize sound corresponding to acceleration/deceleration intents of the driver, a weight value may be assigned to the RPM of the motor of the EV from the CAN signal 20 (S32).

The weight value may be assigned to even an opening degree amount of an accelerator pedal from the CAN signal 20 (S33), and a differential variance in vehicle speed may be applied to vehicle speed data from the CAN signal 20 (S34).

An acceleration condition (S38) or a deceleration condition (S39) is determined from the weight value with respect to the RPM of the motor (S32), the weight value of the opening degree amount of the accelerator pedal (S33), and the differential variance in vehicle speed (S34). That is, the acceleration condition may be determined from one or more among an increment of the vehicle speed, an increment of the RPM of the motor, and an increment of the opening degree amount of the accelerator pedal, and the deceleration condition may be determined from one or more of a decrement of the vehicle speed, a decrement of the RPM of the motor, and a decrement of the opening degree amount of the accelerator pedal.

Alternatively, the deceleration condition may be determined even from the vehicle speed data or regenerative braking information from the CAN signal 20. When the deceleration condition is determined, a vehicle speed weight value may be assigned to the vehicle speed data (S35), and, when regenerative braking is determined from a regenerative braking setting value through real-time monitoring (S36), the deceleration condition may be determined.

When a current condition is determined as the acceleration condition, EV acceleration mode tone control is performed in S40. The $N^{th}$ order component extracted from the input vibration signal of the motor is set as the reference order component, and the $N^{th}$ order component, that is, the level input with respect to the reference order component (S30) is matched to the order component generated in S31 to perform an order arrangement (S40) so that the EV acceleration mode tone control is performed.

Meanwhile, in the EV acceleration mode tone control, the RPM of the motor of the EV from the CAN signal 20 and an RPM of the motor of the EV passing through the variable frequency band filter may be applied.

When the current condition is determined as the deceleration condition, EV deceleration mode tone control is performed in S41. The $N^{th}$ order component extracted from the input vibration signal of the motor is set as the reference order component, and the $N^{th}$ order component, that is, the level input with respect to the reference order component (S30) is matched to the order component generated in S31 to perform an order arrangement (S40) so that the EV deceleration mode tone control is performed.

Meanwhile, in the EV deceleration mode tone control, the RPM of the motor of the EV from the CAN signal 20 and the RPM of the motor of the EV passing through the variable frequency band filter may be applied.

The EV deceleration mode tone control is applied to tone control by setting an order arrangement to be equal to the order arrangement in the EV acceleration mode, and a reduction level of the arranged order component is determined so that a real-time level reduction may be controlled.

An EV mode tone which is set through the EV acceleration/deceleration mode tone control is output (S43). A final output of the EV mode tone is performed in the sound output device 40 including indoor and outdoor audio speakers. In the acceleration mode, acceleration sound is output, and in the deceleration mode, deceleration sound is output.

Figure 4:
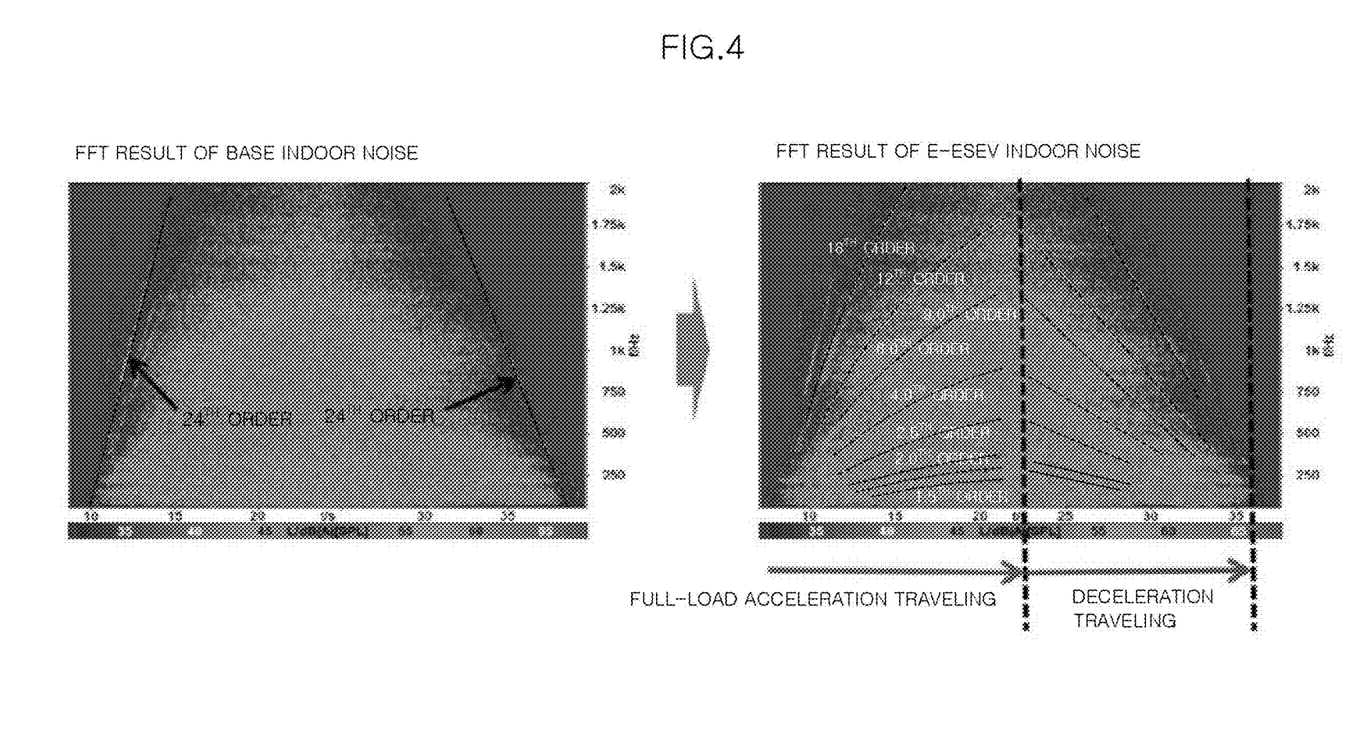
FIG. 4 shows an indoor noise level and a result of performing the EV deceleration mode tone control according to deceleration traveling after full-load acceleration/acceleration conditions from 0 kph to 100 kph of the vehicle speed of the EV.

FIG. 4 shows an indoor noise level and a result of performing the EV deceleration mode tone control according to deceleration traveling after full-load acceleration/acceleration conditions from 0 kph to 100 kph of the vehicle speed of the EV. That is, the result is a result of tone control in the acceleration mode and the deceleration mode, and, even in the deceleration mode, a tone that is the same as the tone in the acceleration mode provides a fade-out feeling in the same manner as control performance of the vehicle. e-ESEV means enhanced electronic sound in the EV.

When tone control is not performed in the EV deceleration mode, abundant EV sound is provided during acceleration. However, sound control is not performed during deceleration and only high-frequency fine noise of the motor/reduction gear is recognized so that discomfort occurs. Thus, a tone that is the same as in the acceleration mode may be implemented through the EV deceleration mode tone control.

Figure 5:
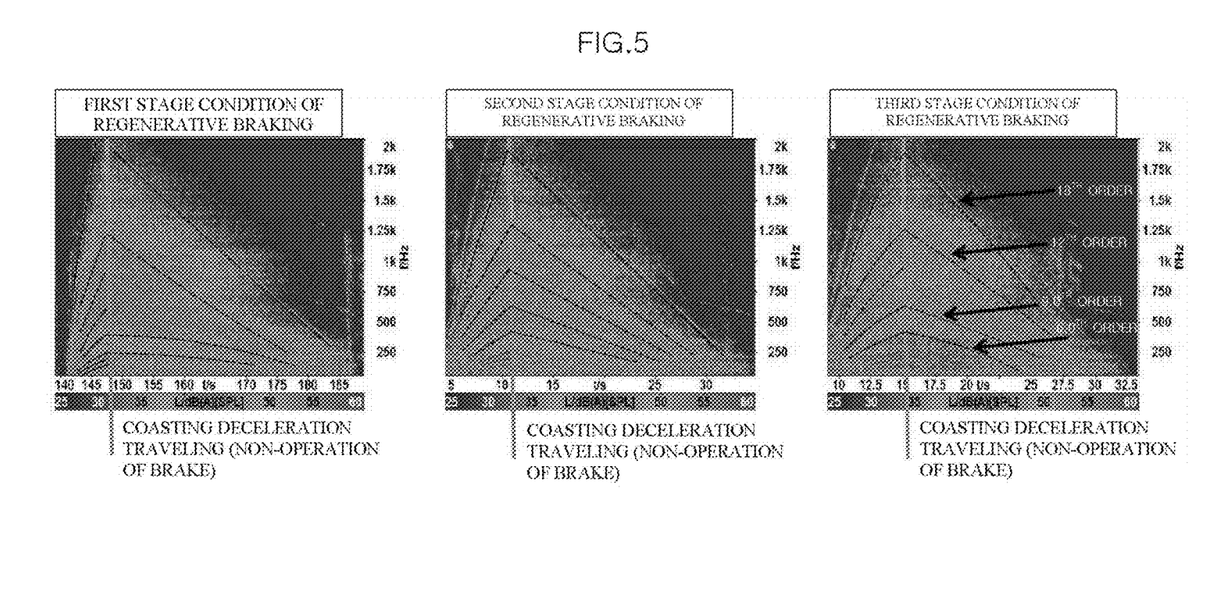
FIG. 5 shows a result of performing the EV deceleration mode tone control according to a regenerative braking operation after the full-load acceleration/acceleration conditions from 0 kph to 100 kph of the vehicle speed of the EV.

FIG. 5 shows a result of performing the EV deceleration mode tone control according to a regenerative braking operation after the full-load acceleration/acceleration conditions from 0 kph to 100 kph of the vehicle speed of the EV. EV regenerative braking is a mode for charging an EV battery using a braking force (reverse torque) during coasting traveling after acceleration. As a regenerative braking stage is raised, a braking force of a brake is strongly generated in a coasting traveling condition. Thus, the sound control is required, and a sound level controlled in the EV deceleration mode for each stage of the regenerative braking condition is controlled to increase a deceleration sound level as the stage is raised from a first regenerative braking stage.

As the regenerative braking step is high and the braking force of the brake is strongly generated, a time required for the regenerative braking step until the vehicle speed of the EV is accelerated from 0 kph to 100 kph in the full-load acceleration condition and then reaches 0 kph again becomes shorter.

In S39 of FIG. 3, after an EV deceleration signal or a regenerative braking signal is recognized, determination of the deceleration condition for the EV deceleration mode tone control is as follows. First, the deceleration condition during traveling includes a tip out of the accelerator pedal (e.g., an opening degree of the accelerator pedal is varied from 50% to 0%), reduction of the RPM of the motor of the EV (e.g., a variation from a high RPM to a low RPM), deceleration in vehicle speed (a variation from a high speed to a low speed), and whether a brake is operated (e.g., the brake is operated during deceleration). Second, the regenerative braking condition is a condition in which only whether the brake is operated is excluded from among the deceleration conditions during traveling and includes the tip out of the accelerator pedal (e.g., an opening degree of the accelerator pedal is varied from 50% to 0%), the reduction of the RPM of the motor of the EV (e.g., the variation from the high RPM to the low RPM), and the deceleration in vehicle speed (the variation from the high speed to the low speed), and the regenerative braking stage may be set and monitored by the driver.

Figure 6:
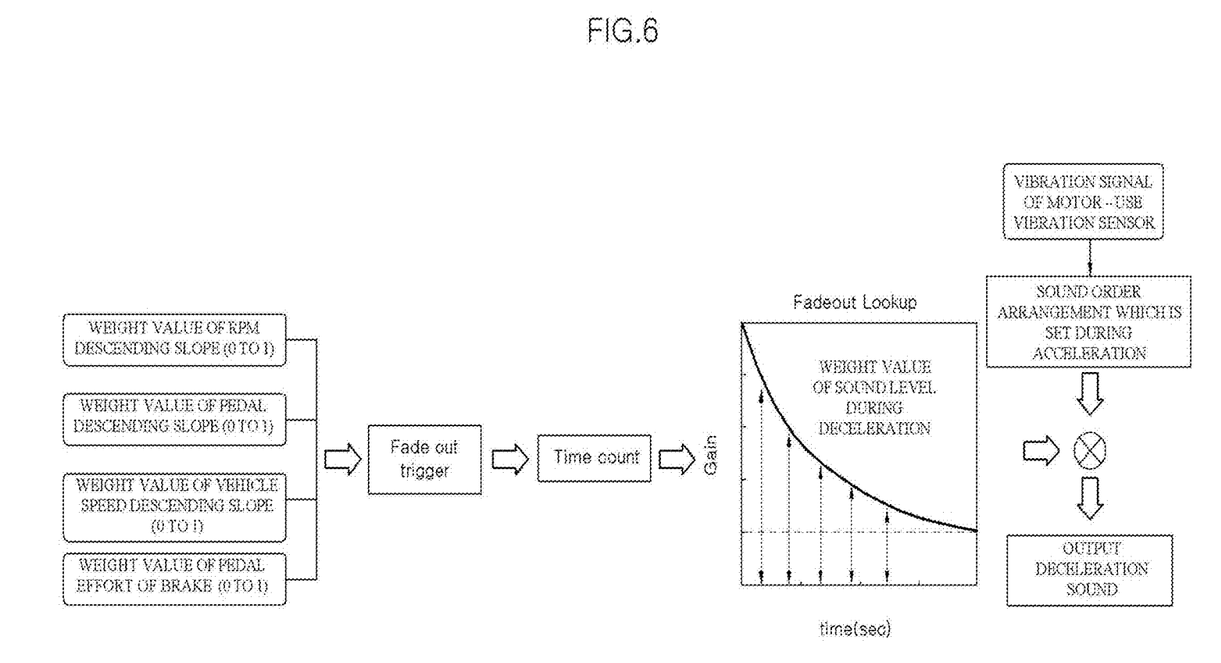
FIG. 6 shows the EV deceleration signal or the regenerative braking signal is recognized and then a weight value is assigned to the EV deceleration signal or the regenerative braking signal.

Referring to FIG. 6, the EV deceleration signal or the regenerative braking signal is recognized and then a weight value is assigned to the EV deceleration signal or the regenerative braking signal so that fade out triggering may be performed. That is, a weight value ranging from zero to one is assigned to each of a slope at which the accelerator pedal descends, a descending slope of the RPM of the motor of the EV, a descending slope of the vehicle speed, and a pedal effort of the brake so that a fade-out operation which gradually decreases the sound level is performed.

As can be seen from FIG. 6, when time counting is performed so as to allow the weight value to be applied in real-time with the passage of time, a weight value of the sound level is decreased over time during deceleration. This may be represented as a fade out lookup table or map, and such a fade out table or map is applied so that the deceleration sound is eventually output. Meanwhile, FIG. 6 shows a tendency that a slope of the weight value of the sound level is decreased due to the fade out operation over time, and this means that the weight value of the sound level is rapidly decreased and then gradually decreased.

As described above, in FIG. 3, all processes from acquisition of the CAN data to the tone control are performed in the signal processing controller 30. Meanwhile, in FIG. 7, the vibration signal of the motor of the EV is measured using the vibration sensor 10 and the $N^{th}$ order component is extracted (S30), and the EV acceleration mode tone control according to the determination of the acceleration condition and the EV deceleration mode tone control according to the determination of the deceleration condition may be performed in a vehicle signal processing controller, but the acquisition and calculation of the CAN data may be performed in an amplifier signal processing controller provided in an amplifier.

Figure 7:
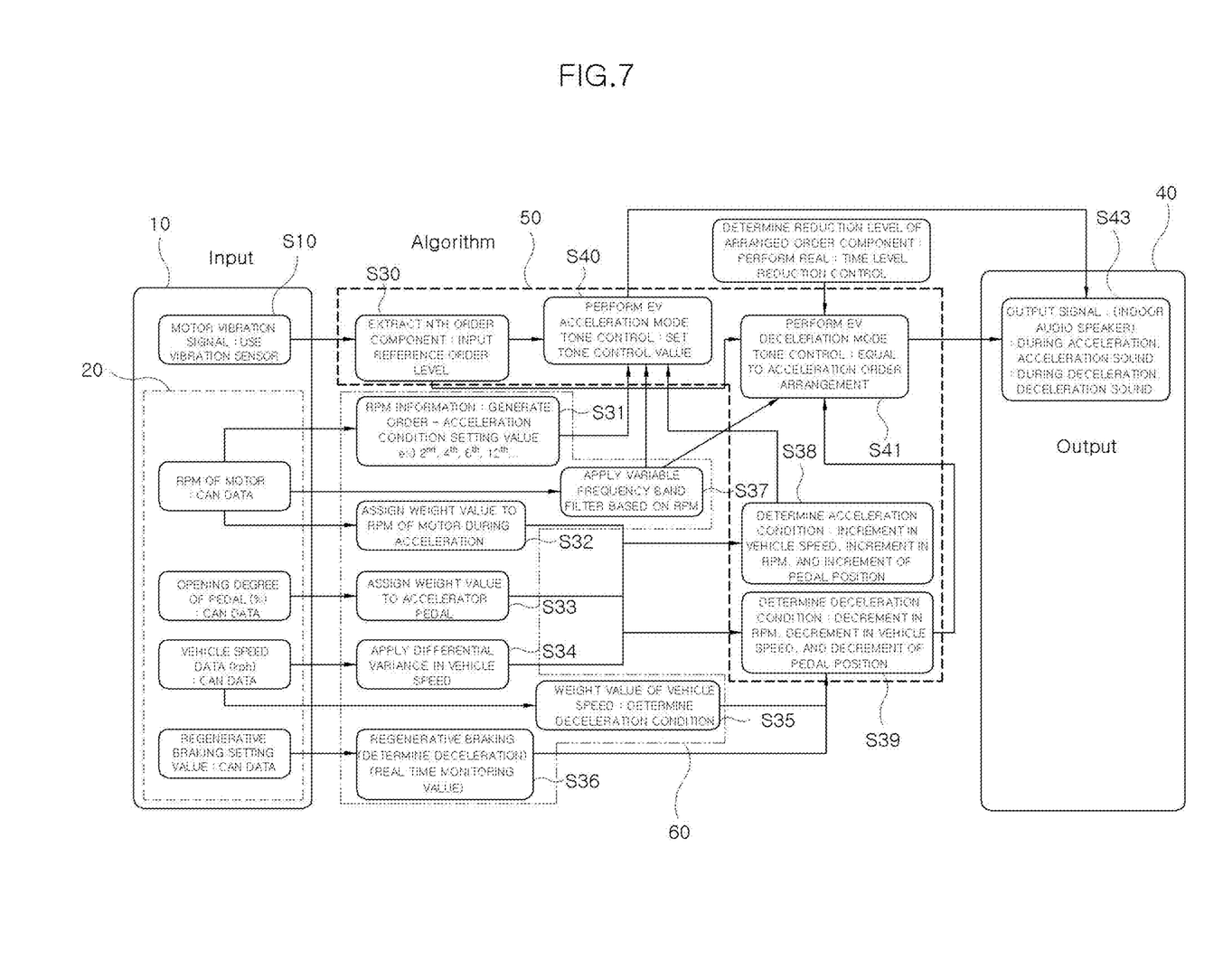
FIG. 7 is a flowchart for describing a case in which an order tracking algorithm with a small amount of calculation is applied, wherein an $N^{th}$ order component is extracted on the basis of revolutions per minute (RPM) information.

That is, the signal processing controller may be divided into a vibration sensor signal processing controller 50 for processing the vibration signal measured by the vibration sensor 10, and an external amplifier signal processing controller 60 for acquiring and calculating the CAN data. That is, the vibration sensor signal processing controller 50 may extract the $N^{th}$ order component (S30) and determine the acceleration and deceleration conditions (S38 and S39) to perform the EV mode tone control (S40 and S41).

Meanwhile, the external amplifier signal processing controller 60 may control the remaining operations except for S30 and S38 to S41.

That is, a micro control unit (MCU) of the external amplifier signal processing controller 60 may perform integrated EV tone control by receiving an EV tone-controlled output signal in S30 and S38 to S41 from the vibration sensor signal processing controller 50 and the vehicle CAN data and then may output the resultant of the integrated EV tone control through various speakers. A function of providing a target tone output signal of the vibration sensor signal processing controller 50 directly performs the calculation process (S30 and S38 to S41) in FIG. 3.

Figure 8:
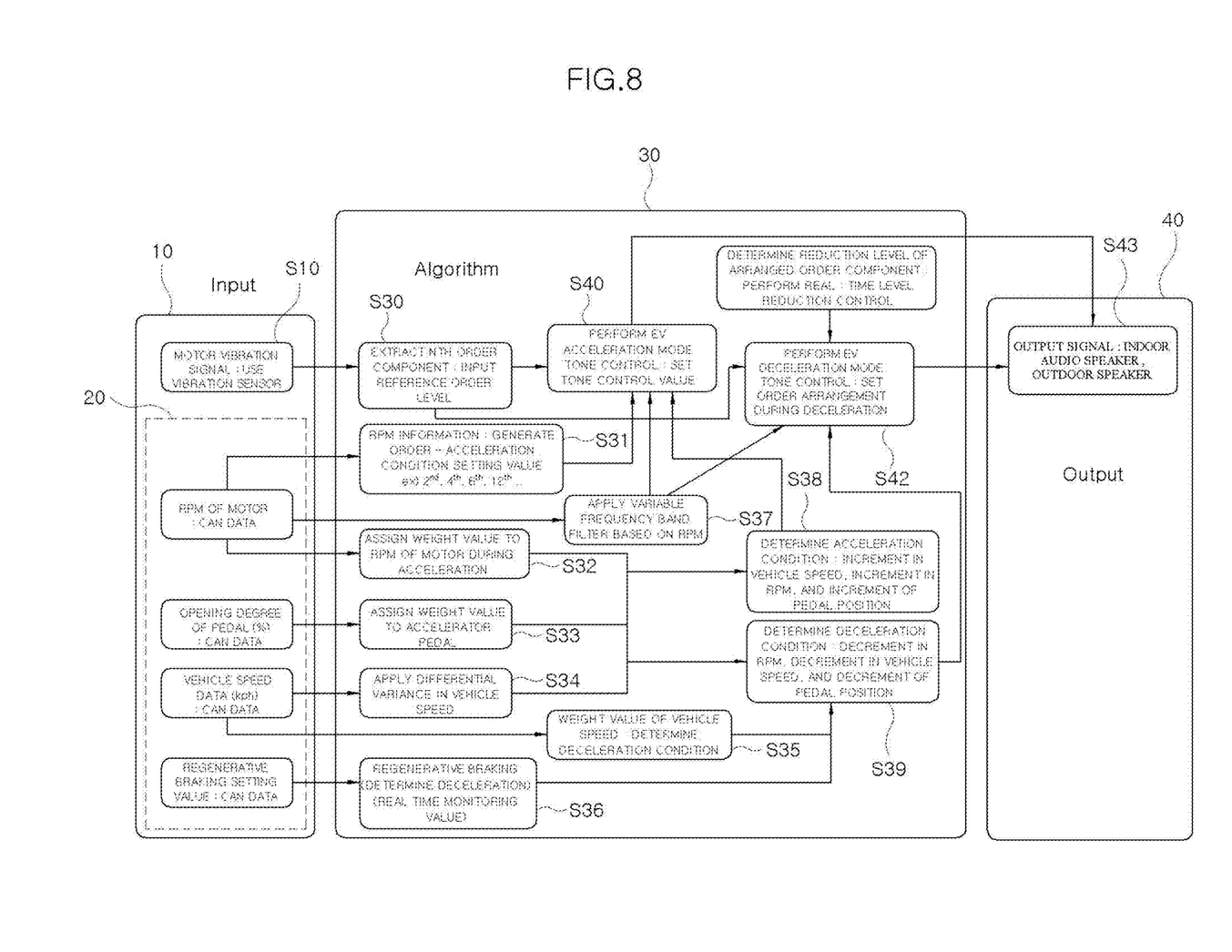
FIG. 8 is a flowchart for describing another example of an algorithm from an input of various signals to an output of a sound output device.

Meanwhile, the EV deceleration mode tone control in the deceleration condition of FIG. 3 is applied to the tone control by setting the order arrangements in the EV acceleration mode to be equal to each other, whereas another embodiment may be considered in FIG. 8. That is, instead of the order arrangement used in the acceleration mode, it is possible to rearrange and set orders during deceleration. As shown in S42 of FIG. 8, when it is determined as a deceleration condition, orders are rearranged and set so as to provide the driver with a notification with respect to deceleration so that this may be used for a purpose different from the acceleration mode, for example, used to notify a deceleration state to the driver and output sound generated during deceleration to the outside to be used as notification sound for protecting pedestrians. In addition to the notification to the driver, an external notification sound which matches the braking performance of the vehicle is implemented so that it is advantageous for pedestrian safety (S44).

Embodiments of the present invention relate to a technology for controlling a tone which matches performance of an electric vehicle (EV) based on a characteristic of a motor of the EV and which is desired by a customer, wherein the technology is capable of extracting order components of a motor vibration having a high correlation with an output characteristic of the motor of the EV in real time, implementing desired sounds of an internal combustion engine, which matches a power performance characteristic of the EV, and controlling ultra-modern sound using a high-frequency characteristic.

In addition, even during deceleration, a tone using a speaker can be reinforced or changed with a control setting value using an $N^{th}$ order component, and a fade out is applied in consideration of an EV characteristic (silence) so that a natural deceleration tone can be provided. Consequently, during deceleration, it is possible to mask unpleasant high-frequency fine noise and provide sound which is consistent with braking performance.

While the present disclosure has been described with reference to the accompanying drawings, it will be apparent to those skilled in the art that various changes and modifications may be made without departing from the spirit and scope of the present disclosure without being limited to the exemplary embodiments disclosed herein. Accordingly, it should be noted that such alternations or modifications fall within the claims of the present disclosure, and the scope of the present disclosure should be construed on the basis of the appended claims.

What is claimed is:

1. A method of controlling a tone of an electric vehicle (EV) based on a motor vibration in deceleration or regenerative braking conditions, the method comprising:
    calculating order components from vibration signals of a rotating motor of the EV;
    extracting an $N^{th}$ order component having a determination coefficient $R^2$ which represents linearity with respect to an output torque of the motor among the calculated order components and is greater than or equal to a predetermined value;
    converting a revolutions per minute (RPM) of the motor of the EV into a frequency and calculating an order frequency;
    arranging the order components by applying a vibration level of the $N^{th}$ order component to a level of the order frequency to be output and setting an EV mode tone; and
    in a deceleration of the EV, determining a deceleration condition and then applying the vibration level of the $N^{th}$ order component to level control of the order frequency for setting the EV mode tone.

2. The method of claim 1, further comprising using a vibration sensor to measure vibration of the rotating motor of the EV.

3. The method of claim 1, further comprising playing a sound through audio speakers, the sound based on the set EV mode tone.

4. The method of claim 1, further comprising outputting the EV mode tone to which a deceleration intent is applied.

5. The method of claim 4, wherein the deceleration condition is determined by driver braking.

6. The method of claim 5, further comprising, after determining the deceleration condition using a fade-out algorithm in the level control of the order frequency.

7. The method of claim 6, wherein the fade-out algorithm uses a deceleration weight value using one or more among a decrement in RPM of the motor of the EV, a decrement in accelerator pedal position, a decrement in vehicle speed, and an increment in pedal effort of a brake.

8. The method of claim 7, further comprising applying the deceleration weight value being decreased over time.

9. The method of claim 8, wherein a slope of the deceleration weight value is decreased over time.

10. The method of claim 9, wherein the deceleration weight value converges to a predetermined value over time.

11. The method of claim 6, wherein the fade-out algorithm uses a multiplied result of deceleration weight values using one or more among a decrement in RPM of the motor of the EV, a decrement in accelerator pedal position, a decrement in vehicle speed, and an increment in pedal effort of a brake.

12. The method of claim 11, wherein the fade-out algorithm uses a lookup table in which the deceleration weight value is stored.

13. The method of claim 4, further comprising rearranging the order components by applying the vibration level of the $N^{th}$ order component to the level of the order frequency to be output.

14. The method of claim 13, wherein rearranging the order components comprises using an indoor audio or speaker so as to provide deceleration notification sound to a driver.

15. The method of claim 13, wherein rearranging the order components comprises using an outdoor speaker so as to provide deceleration sound for protection of pedestrians.

16. A method of controlling a tone of an electric vehicle (EV) based on a motor vibration in deceleration or regenerative braking conditions, the method comprising:
    calculating order components from vibration signals of a rotating motor of the EV;
    extracting an $N^{th}$ order component having a determination coefficient $R^2$ which represents linearity with respect to an output torque of the motor among the calculated order components and is greater than or equal to a predetermined value;
    converting a revolutions per minute (RPM) of the motor of the EV into a frequency and calculating an order frequency;
    arranging the order components by applying a vibration level of the $N^{th}$ order component to a level of the order frequency to be output and setting an EV mode tone; and
    in a deceleration of the EV by regenerative braking, applying the vibration level of the $N^{th}$ order component to level control of the order frequency for setting the EV mode tone.

17. The method of claim 16, wherein a fade-out algorithm is used in the level control of the order frequency, and the fade-out algorithm uses a deceleration weight value using one or more among a decrement in RPM of the motor of the EV, a decrement in accelerator pedal position, a decrement in vehicle speed, and an increment in pedal effort of a brake.

18. A method of controlling a tone of an electric vehicle (EV) based on a motor vibration in deceleration or regenerative braking conditions, the method comprising:
    calculating order components from vibration signals of a rotating motor of the EV;
    extracting an $N^{th}$ order component having a determination coefficient $R^2$ which represents linearity with respect to an output torque of the motor among the calculated order components and is greater than or equal to a predetermined value;
    converting a revolutions per minute (RPM) of the motor of the EV into a frequency and calculating an order frequency;
    arranging the order components by applying a vibration level of the $N^{th}$ order component to a level of the order frequency to be output and setting an EV mode tone; and
    in a deceleration of the EV, determining a deceleration condition and then setting the same order arrangements in an EV acceleration mode to level control of the order frequency for setting the EV mode tone.

19. The method of claim 18, wherein the deceleration condition is determined by driver braking or regenerative braking.

* * * * *